(12) United States Patent
Gruber et al.

(10) Patent No.: US 8,998,499 B2
(45) Date of Patent: Apr. 7, 2015

(54) SEAL FOR ROLLING BEARING USED IN A WIND TURBINE

(71) Applicant: Aktiebolaget SKF, Göteborg (SE)

(72) Inventors: Andreas Gruber, Maria Buch-Feistritz (AT); Wolfgang Swete, Knittelfeld (AT); Pascal Ovize, Chitry-le-fort (FR); Jesko-Henning Tanke, Schweinfurt (DE); Ake Fick, Landskrona (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 14/034,671

(22) Filed: Sep. 24, 2013

(65) Prior Publication Data

US 2014/0023303 A1    Jan. 23, 2014

Related U.S. Application Data

(62) Division of application No. 13/123,962, filed on Jun. 28, 2011, now Pat. No. 8,613,557.

(30) Foreign Application Priority Data

Oct. 14, 2008  (WO) ................. PCT/EP2008/063793
Oct. 9, 2009   (WO) ................. PCT/EP2009/063222

(51) Int. Cl.
*F16C 33/76*    (2006.01)
*F16J 15/32*    (2006.01)
*F16C 33/78*    (2006.01)
(Continued)

(52) U.S. Cl.
CPC ........... *F16C 33/767* (2013.01); *F16C 33/7816* (2013.01); *F16C 19/181* (2013.01); *F16C 33/7836* (2013.01); *F16J 15/3236* (2013.01); *F16J 15/3456* (2013.01); *F16J 15/441* (2013.01); *F16C 33/583* (2013.01); *F16C 2300/14* (2013.01)

(58) Field of Classification Search
CPC . F16J 15/3236; F16J 15/3268; F16J 15/3456; F16C 19/181; F16C 33/583; F16C 33/768; F16C 33/7816; F16C 33/7836
USPC .......... 384/477, 482, 484–486, 607; 277/345, 277/363, 397, 402, 406, 437, 454, 491, 541, 277/595, 644, 626; 29/898.06
See application file for complete search history.

(56) References Cited

U.S. PATENT DOCUMENTS 2,124,526 A     7/1938  Goldsworthy
3,306,687 A *   2/1967  Smith ........................... 384/450
(Continued)

FOREIGN PATENT DOCUMENTS

DE       973597 C        4/1960
DE       10308702 A1     9/2004
(Continued)

*Primary Examiner* — Marcus Charles
(74) *Attorney, Agent, or Firm* — Bryan Peckjian; SKF USA Inc. Patent Dept.

(57) ABSTRACT

The rolling bearing comprises an inner ring 1, an outer ring 2, at least one row of rolling elements and at least one seal 7 provided between the outer and inner rings. The seal 7 has, in cross section, the overall shape of an H and comprises internal lips 21, 22 and external lips 23, 24 forming the two substantially parallel branches of the H. The inner and outer rings 1, 2 comprise opposite radial ribs 25, 26 located axially between the internal and external lips 21 to 24 to axially retain the seal.

11 Claims, 4 Drawing Sheets

(51) Int. Cl.
*F16C 19/18* (2006.01)
*F16J 15/34* (2006.01)
*F16J 15/44* (2006.01)
*F16C 33/58* (2006.01)

(56) References Cited

U.S. PATENT DOCUMENTS

| | | |
|---|---|---|
| 3,458,207 A | 7/1969 | Conti |
| 3,901,566 A | 8/1975 | Riegler et al. |
| 5,348,402 A | 9/1994 | Porter |
| 2008/0124015 A1* | 5/2008 | Fujiwara et al. .............. 384/484 |
| 2009/0194945 A1 | 8/2009 | Bhat et al. |

FOREIGN PATENT DOCUMENTS

| | | | |
|---|---|---|---|
| DE | 102008061832 A1 | 8/2009 | |
| FR | 2778954 A1 | 11/1999 | |
| GB | 1026007 A * | 4/1966 | ............. F16C 33/78 |
| GB | 2163498 A | 2/1986 | |
| JP | 2008133871 A * | 6/2008 | ............. F16G 13/02 |

* cited by examiner

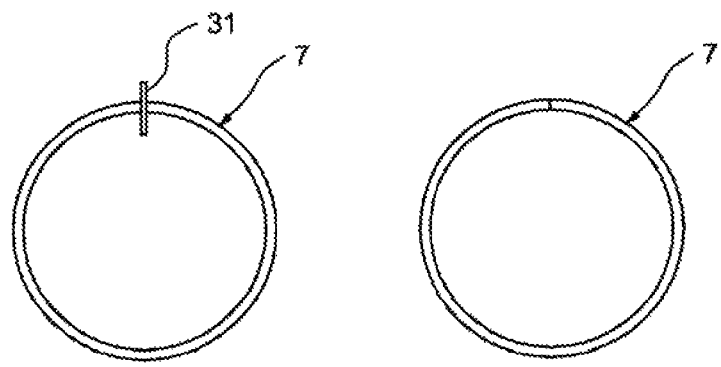
FIG. 5A
FIG. 5B   FIG. 5C
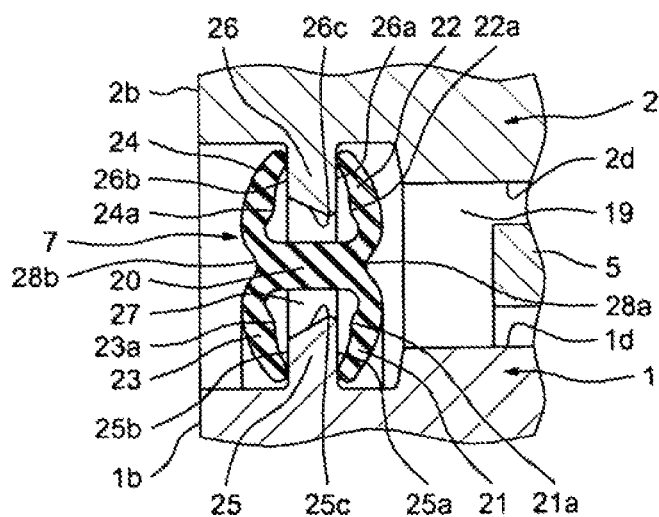
FIG. 6

SEAL FOR ROLLING BEARING USED IN A WIND TURBINE

CROSS-REFERENCE TO RELATED APPLICATION

This application is a United States Non-Provisional Divisional Patent Application claiming the benefit of U.S. Non-Provisional Utility patent application Ser. No. 13/123,962 filed on 28 Jun. 2011 (issued as U.S. Pat. No. 8,613,557 on Dec. 24, 2013), which is a National Stage Patent Application claiming the benefit of International Application Serial Number PCT/EP2009/63222 filed on 9 Oct. 2009, which claims the benefit of European Patent Application Serial Number PCT/EP2008/063793 having a priority date of 14 Oct. 2008, which are incorporated herein in their entireties.

TECHNICAL FIELD

The present invention relates to the field of seals used in the rolling bearings, and more particularly in the rolling bearings operating in an aggressive outdoor environment due to the presence of various kinds of pollution, such as splashing water, dust and other foreign matter, to the exposition of the ultraviolet radiation emitted by the sun, and to the variations of temperature.

BACKGROUND ART

This is notably the case of the rolling bearings used in a wind turbine in order to angularly orient the rotor of the turbine according to the direction of the wind.

Otherwise, in the case of rolling bearings, and more specifically in the case of large-sized rolling bearings used for instance in such wind turbine, each time the bearing is lubricated, there is a high increase in the pressure inside the bearing. During this operation, the pressure may raise to 0.4 MPa. Thus, there is a risk that the surplus grease will be ejected from the bearing at the location of the seals. In the case of large-sized rolling bearings, pressure relief valves are provided to allow this surplus grease to be ejected. Nonetheless, the surplus grease does sometimes escape from the bearing via the seals rather than through these valves.

However, there are numerous applications in which an escape of grease through the bearing seals must be reliably avoided, both during the lubricating of the bearings, i.e. while the interior of the bearings is being pressurized, and during normal running of the bearings, even in the case of relative movements that the two rings may do in addition to the rotational movements, under the action of the loads on the bearing. Such relative movements of the rings are relatively important more especially as the rolling bearing has a large diameter.

With the aim of avoiding this drawback, document FR-A-2 778 954 discloses a sealing arrangement for a rolling bearing comprising at least one row of rolling elements between first and second rings which are concentric and radially separated from one another by an annular space. This arrangement comprises at least an elastic seal fixed to the first ring and exhibiting a lip pressing against a bearing surface situated on the second ring inside the annular space. The lip of the seal is shaped in such a way that the force with which it presses against the bearing surface increases with the pressure inside the bearing.

With such a sealing arrangement, the lip opposes effectively any escape of grease, not only during lubrication but also during normal running of the bearing.

However, the sealing arrangement disclosed in this document has the drawback of being force fitted into a groove formed on the inner ring of the rolling bearing in order to obtain its retaining on the ring. This is detrimental in terms of mounting time and of cost.

One aim of the present invention is to overcome the aforementioned drawback.

DISCLOSURE OF INVENTION

It is a particular object of the present invention to provide a rolling bearing having at least a seal which is easy to install, which prevents grease from escaping from the bearing, even under the effect of a raised pressure inside the bearing, and which also prevents the ingress of moisture, dust and other bodies.

A further object to the present invention is to provide a rolling bearing having good wear and aging resistances.

Another object to the present invention is to provide a large-sized rolling bearing adapted for a wind turbine.

In one embodiment, the rolling bearing comprises an inner ring, an outer ring, at least one row of rolling elements and at least one seal provided between the outer and inner rings. The seal has, in cross section, the overall shape of an H. The seal comprises internal lips and external lips of the seal forming the two substantially parallel branches of the H. The inner and outer rings comprise opposite radial ribs located axially between the internal and external lips to axially retain the seal.

Preferably, the internal and external lips of the seal are resiliently coupled in the axial direction with the radial ribs.

In one embodiment, the axial thickness of the radial ribs is larger than the axial gap between the internal lips and the external lips in a free state of the joint in order to keep in a permanent contact the seal and the ribs by elasticity.

Advantageously, the seal is freely moveable in the circumferential direction relative to the inner ring and/or the outer ring.

The internal lips can exhibit an outwardly curved profile so that only the free ends of the lips press against retaining surfaces of the ribs. The retaining surfaces of the ribs are substantially perpendicular to the rotational axis of the bearing.

In one embodiment, the radial ribs define an annular passage narrowing inwardly in direction of the rolling elements.

Preferably, the seal has hardness equal to or greater than 90 shore A. Advantageously; the seal is formed from thermoplastic urethane (TPU) liner. The seal can also be formed from metal. The seal can also comprise both a metallic material and a plastic material such as the TPU.

At least the internal lips each comprise advantageously, on their external side, a protrusion axially extending towards the external lips The ribs may be integrally formed with the inner and outer rings, or be separate bodies. The ribs can comprise on their outer surfaces a coating The invention also relates to a manufacturing method of a seal for a rolling bearing in which the seal is manufactured in the form of a band and is then cut to the desired length, and in which the ends of the seal are heated in order to weld them, the seal being rolled on itself with the ends placed end-to-end to obtain an annular seal.

In another embodiment, the seal is adapted to a rolling bearing comprising an inner ring, an outer ring, and at least one row of rolling elements between the outer and inner rings. The seal has, in cross section, the overall shape of an H and comprises internal lips and external lips forming the two branches of the H. The internal and external lips are connected each other. The seal is formed from metal.

In another embodiment, the seal is adapted to a rolling bearing comprising an inner ring, an outer ring, and at least one row of rolling elements between the outer and inner rings. The seal has, in cross section, the overall shape of an H and comprises internal lips and external lips forming the two branches of the H. At least the internal lips each comprise, on their external side, a protrusion axially extending towards the external lips.

The invention also relates to an assembly method of a seal inside a rolling bearing comprising an inner ring, an outer ring, at least one row of rolling elements between the outer and inner rings, and opposite radial ribs provided on the ribs, wherein the seal having in cross section the overall shape of a H is axially pushed between the inner and outer rings, a first branch of the H being radially deformed inwards and passing through an annular passage defined by the ribs. The seal is still axially pushed until a second branch of the seal bears against the ribs, the first branch recovering by elasticity its initial shape.

The seal may be axially pushed between the rings in order that the first branch of the H bears against the ribs, the branch being then radially deformed inwards. Alternatively, the first branch of the H is radially deformed inwards by means of a tool before the seal is axially pushed between the rings.

BRIEF DESCRIPTION OF DRAWINGS

An illustrative and non-limiting embodiment of the present invention will be described below in detail with reference to the appended drawings, in which:

FIGS. 5A to 5C represent the steps for manufacturing the seal shown on FIG. 3;

FIG. 6 is a part section showing a rolling bearing according to a second embodiment of the invention.

DETAILED DESCRIPTION

Figure 1:
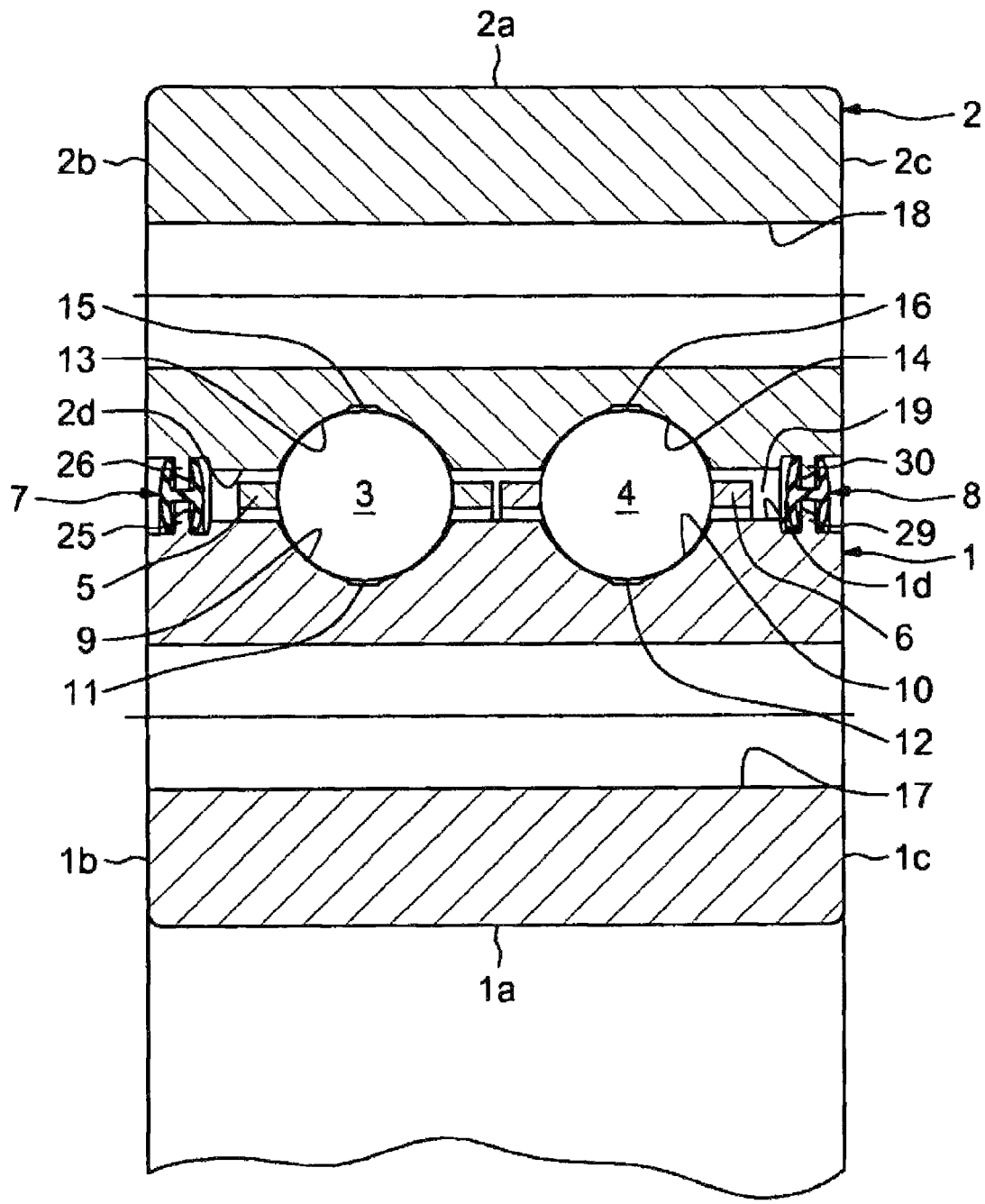
FIG. 1 is a half section of a rolling bearing according to a first embodiment of the invention.

The rolling bearing as illustrated by FIG. 1 is a large-diameter rolling bearing comprising an inner ring 1 and an outer ring 2 between which are housed two rows of rolling elements 3 and 4, which in this case are balls, two annular cages 5, 6 for respectively maintaining the circumferential spacing of rolling elements 3 and 4, and two annular seals 7 and 8.

The inner and outer rings 1, 2 are concentric and symmetric with respect to a transverse radial plane passing through the centre of the rolling bearing. The inner ring 1 is of the solid type. A "solid ring" is to be understood as a ring obtained by machining with removal of material (by machining, grinding) from steel tube stock, bar stock, rough forgings and/or rolled blanks.

The inner ring 1 has a bore 1a of cylindrical shape designed to be fixed to a chassis or to a structure of a machine (not shown) and delimited by opposite radial lateral surfaces 1b, 1c. The inner ring 1 also includes a stepped exterior cylindrical surface 1d onto which first and second toroidal circular races 9, 10 are formed. The races 9 and 10 are mutually symmetric with respect to the transverse radial plane passing through the centre of the rolling bearing. Each race 9, 10 is subdivided by an annular groove 11, 12 into two raceways having in cross section a concave internal profile adapted to the rolling elements 3, 4. The raceways of the races 9, 10 are directed outwards.

The outer ring 2, also of the solid type, includes an outer cylindrical surface 2a delimited by opposite radial lateral surfaces 2b, 2c. The radial lateral surfaces 2b and 1b, 2c and 1c of the inner and outer rings 1, 2 are respectively coplanar. The outer ring 2 also includes a stepped bore 2d of cylindrical shape into which first and second toroidal circular races 13, 14 are formed. The races 13, 14 are mutually symmetric with respect to the radial plane passing through the centre of the rolling bearing. Similarly to races 9 and 10, each race 13, 14 is subdivided by an annular groove 15, 16 into two raceways having in cross section a concave internal profile adapted to the rolling elements 3, 4. The raceways of the races 13, 14 are directed radially inwards. Each rolling element 3, 4 respectively arranged between the raceways of the races 9, 13 and 10, 14, while at the same time being kept spaced apart by the cages 5 and 6, have four points of contact with the rings 1, 2.

The rings 1, 2 comprise, in a way known per se, holes 17 and 18 for fixing the two rings to two parts of a machine, which can rotate one with respect to the other by virtue of the rolling bearing.

The two rings 1, 2 are separated radially from one another by an annular space 19 in which the cages 5 and 6 rotate. The seals 7, 8 are positioned radially between the inner and outer rings 1, 2 inside the annular space 19. The seal 7 is mounted axially between the rolling elements 3 and the radial surfaces 1b, 2b of the rings 1, 2. The seal 7 is entirely housed into the rings 1 and 2. In other words, the seal 7 is axially offset relative to the radial surfaces 1b, 2b towards the interior of the rolling bearing.

The seal 8 is positioned axially between the rolling elements 4 and the radial surfaces 1c, 2c of the rings 1 and 2, remaining distant from the surfaces. The seal 8 is identical to the seal 7 and is positioned symmetrically with respect to the latter with regard to the radial plane passing through the centre of the rolling bearing. A closed space is defined between the rings 1, 2 and the seals 7, 8 in which the rolling members 3, 4 are housed so as to be protected against polluting elements.

Figure 2:
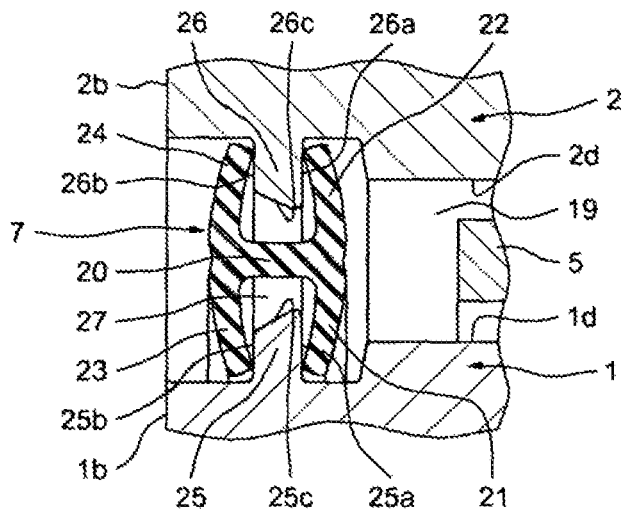
FIG. 2 is a part section on a larger scale of the rolling bearing of FIG. 1.

As shown more clearly on FIG. 2, the seal 7 has, in cross section, the overall shape of an H. The seal 7 formed of an elastic material comprises an annular portion 20, two annular internal lips 21, 22 forming one of the branches of the H, and two annular external lips 23, 24 forming the other branch of the H. The lips 21, 22 and 23, 24 are symmetric with respect to a transverse radial plane passing through the centre of the seal 7, the lips 21, 23 and 22, 24 being also symmetric with respect to a transverse axial plane passing through the portion 20. The lips 21, 23 and 22, 24 respectively press against annular radial protrusions of an inner ring radial inner ring radial rib 25 and an outer ring radial rib 26 provided on the inner and outer rings 1 and 2 and radially facing each other. The lips 21, 22 and 23, 24 have a certain degree of axial elasticity and join or attach directly the annular portion 20.

The annular inner ring radial rib 25 extends radially from the exterior cylindrical surface 1d of the inner ring 1 in the direction of the outer ring radial rib 26 of the outer ring 2. The inner ring radial rib 25 is in the vicinity of the radial surface 1b. The inner ring radial rib 25 is delimited by opposite radial lateral surfaces 25a, 25b and by a frustoconical exterior surface 25c orientated in such a way that its upward extension is located towards the cage 5 and the rolling elements 3, i.e. on the internal side of the rolling bearing. Here, the frustoconical surface 25c makes an angle of approximately 45° with the axis of the rolling bearing.

Similarly, the annular outer ring radial rib 26 provided on the bore 2d of the outer ring 2 is delimited by opposite radial lateral surfaces 26a, 26b and by a frustoconical bore 26c. The radial lateral surfaces 25a and 26a, 25b and 26b are respectively coplanar. By considering the frustoconical exterior surface 25c, the bore 26c has a slope in an opposite direction. Thus, the downward extension of the bore 26c is located towards the cage 5 and the rolling element 3. The ribs 25, 26 delimit an annular passage or a hole 27 radially delimited by the frustoconical surfaces 26c, which narrows inwards in direction of the rolling elements 3.

The seal 7 is axially maintained into the space 19 defined between the inner and outer rings 1, 2 by the opposite radial ribs 25, 26. More precisely, the surfaces 25a, 26a, 25b, 26b respectively form retaining surfaces for the lips 21 to 24. The annular portion 20 of the seal 7 is radially disposed into the hole 27 in a non-contact state.

The lips 21, 22 exhibit an outwardly curved profile so that only their free ends press against the bearing surfaces 25a, 26a. Similarly, the lips 23, 24 exhibit an inwardly curved profile so that in absence of pressure, only their free ends respectively press against the retaining outer surfaces 25b, 26b. The free ends of branches of the seal 7 converge axially towards one another. In the embodiment depicted, the lips 21, 22 and 23, 24 are shaped and dimensioned in such a way that their lines of pressing against the inner ring radial rib 25 and 26 are perpendicular to the axis of the rolling bearing.

In order to keep in a permanent contact state the lips 21, 23 and 22, 24 with ribs 25 and 26, the thickness of the ribs is made larger than the axial gap between the lips in a free state. Thus, by the elasticity of the seal 7 in axial direction, the lips 21 to 24 are kept in permanent contact with the retaining surfaces 25a, 26a, 25b, 26b. The seal 7 and the ribs 25, 26 are thus resiliently coupled in the axial direction which prevents relative axial displacement between the seal 7 and the rings 1, 2.

The annular ribs 25, 26 axially maintain the seal 7 into the space 19 defined between the inner and outer rings 1 and 2. The ribs 25, 26 constitute a means of axially retaining the seal 7 into the space 19 provided between the rings 1, 2. To this end, the internal diameter of the lips 21, 23 is smaller than the diameter of the downward extension of the frustoconical surface 25c, and the external diameter of the lips 22, 24 is larger than the diameter of the downward extension of the frustoconical bore 26c.

The seal 7 is radially maintained into the space 19 by the inner and outer rings 1 and 2. Radial gaps are provided between the lips 21, 23 and the exterior surface 1d, and between the lips 22, 24 and the bore 2d. Thus, slight relative radial movements may occur between the rings 1, 2 and the seal 7.

The internal lips 21, 22 axially located towards the cage 5 and the rolling element 3, i.e. on the internal side of the rolling bearing, which are in contact with the ribs 25, 26 prevent any escape of grease from the inside of the bearing to the outside.

Besides, by virtue of the outwardly curved profile of the lips 21, 22 and of their cooperation with the retaining surfaces 25a, 26a, any increase of pressure inside the bearing leads to an increase of the pressing force of the lips 21, 22 against the retaining surfaces 25a, 26a without the risk of the lips being expelled under the effect of the raised pressure likely to occur, for example, when lubricating the bearing through greasing holes (not shown). In this case, there may be a radial planar contact between the lip 21 and the retaining surface 25a, and between the lip 22 and the retaining surface 26a. The radial gaps between the lips 21 and the inner ring 1, and between the lips 22 and the outer ring 2 make these planar contacts easier.

The external lips 23, 24 axially located towards the external side of the rolling bearing which are in contact with the ribs 25, 26 prevent foreign matter from entering inside of the bearing, such as moisture, dust or muddy water. The internal lips 21, 22 supplement the action of the external lips 23, 24, and improve the protection against the ingress of moisture and other foreign bodies into the bearing from the outside.

The internal lips 21, 22 and the external lips 23, 24 of the seal 7 also maintain their functions in the event of relative movements of the two rings 1 and 2 under the action of loads (axial, radial, tipping moments) to which the bearing may be subjected during running, without the seal 7 losing its sealing function.

During running, the seal 7 can move in the circumferential direction relative to the inner ring 1 and/or outer ring 2. In this case, sliding occurs against the retaining surfaces 25a, 25b, 26a, 26b. With such a sliding, a little wear may occur on the lips 21 to 24 of the seal. However, with the elasticity of the seal 7 in axial direction, the lips 21 to 24 are kept in permanent contact with the retaining surfaces 25a, 26a, 25b, 26b. By virtue of the radial gaps between the lips 21, 23 and the ring 1, and between the lips 22, 24 and the ring 2, a slight radial movement can also occur between the seal 7 and the rings.

Figure 3:
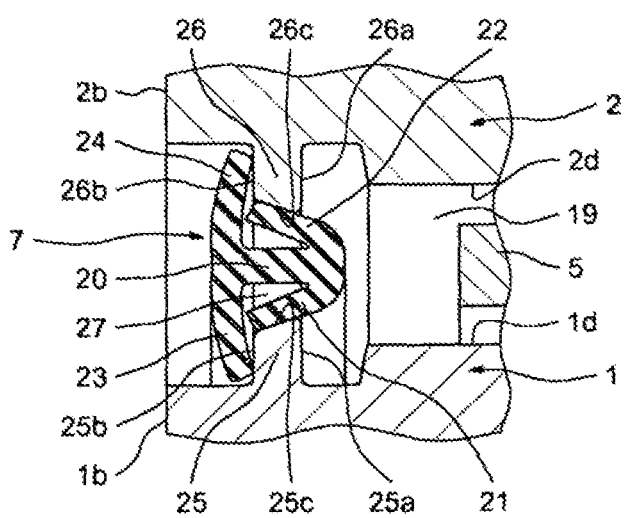
FIG. 3 is a part section showing the mounting of one of the seals into the rolling bearing of FIG. 1.

The angular movement of the seal 7 relative to the rings 1, 2 remains possible since there is no fixing part between these elements. The seal 7 is namely not rigidly fixed to one of the rings 1, 2 in the circumferential direction. This makes the mounting of the seal 7 easier into the rings 1, 2 of the bearing. Specifically, the seal is mounted with a simple axial pushing movement without angular indexation. More precisely, with the axial pushing movement, the lips 21, 22 initially bear against the radial surfaces 25b, 26b. After, as shown on FIG. 3, by virtue of the frustoconical surface 25c and bore 26c, the lips 21, 22 are radially compressed or deformed towards the annular portion 20. After, passing through the hole 27, the lips 21, 22 recover by elasticity their initial shape. Finally, the lips 23, 24 press against the retaining surfaces 25b, 26b of the ribs 25, 26. In this mounted position of the seal 7, the ribs 25, 26 are axially clamped between the lips 21, 23 and 22, 24. The contact of the lips directed axially in direction of the ribs prevents any axial movement of the seal 7 with respect to the rings 1, 2.

Figure 4:
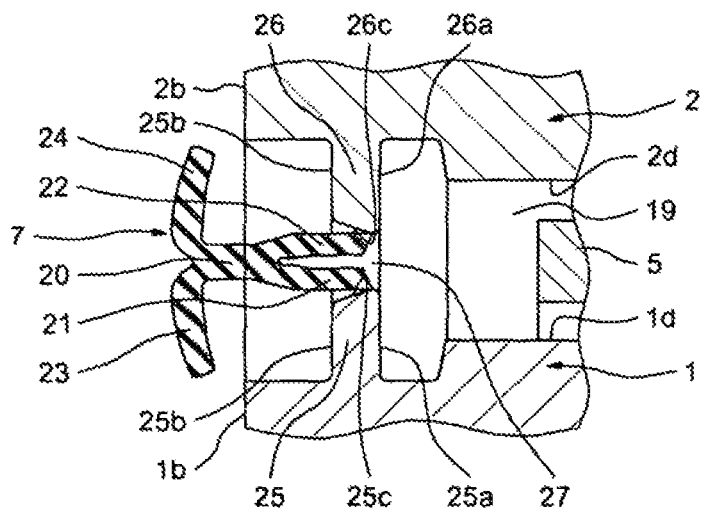
FIG. 4 is a part section showing the mounting of one of the seals into the rolling bearing of FIG. 1 according to another method.

Alternatively, to obtain the mounting of the seal 7 into the rings 1, 2 of the bearing, it could also be possible to use a tool in order to radially deform inwards the lips 21, 22 before to position the seal into the space 19 defined by the rings, as shown on FIG. 4. Outside of the rolling bearing, the lips 21, 22 are bended inwards to be located axially in the continuation of the annular portion 20 towards the rolling bearing. Then, the seal 7 is axially pushed between the rings 1, 2 in order that the bended lips 21, 22 pass through the hole 27 defined by the ribs 25, 26 until the lips 23, 24 press against the retaining surfaces 25b, 26b of the ribs. After passing through the hole 27, the lips 21, 22 expand elastically and recover their initial shape and press against the retaining surfaces 25b, 26b of the ribs 25, 26.

With such a mounting method, it is possible to reduce the axial dimension of the seal 7. In fact, the expansion of the lips 21, 22 to recover their shape begins before that the lips 23, 24 press against the retaining surfaces 25b, 26b. The axial dimension of the annular portion 20 may thus be reduced. Besides, with such a deformation of the lips 21 and 22, the radial distance between the lips in the deformed state between the ribs 25, 26 is closed and the radial dimension of the seal may also be reduced. With this mounting method, it is also possible to foresee ribs 25, 26 with an exterior surface 25c and a bore 26c having a cylindrical shape.

To make easier the bending of the internal lips 21 and 22, a depression or a concavity may be provided on the internal side of the seal 7 radially located between the internal lips. On FIG. 4, such a depression is also provided on the external side of the seal. These depressions are located in the axial plane passing through the centre of the seal 7.

Advantageously, the seal 7 is integrally formed from a thermoplastic urethane (TPU) liner offering a good resistance to low and high temperatures, to wear, to ozone, to ultraviolet radiations, and being an excellent fungal inhibitor. Besides, with such a material, the seal 7 can easily be manufactured by extrusion at the desired shape in cross section in the form of a band as shown on FIG. 5A, and after cutting to the desired length, and then wound on itself as depicted on FIG. 5B. To obtain the seal 7, a heating plate 31 is used to heat the ends of the band in order to weld them end to end (FIG. 5C). With such a welding, the mechanical properties of the seal outperform those obtained with a seal wounding on itself and connected end to end by glue. Besides, with the use of a thermoplastic urethane liner, the seal 7 is flexible enough to allow an easy installation into the bearing but has also enough stiffness for its axial retaining on the ribs 25, 26.

Preferably, the seal material has a shore A hardness equal to or greater than 90, for a good compromise between stiffness and sealing effect.

As above-mentioned, the sealing of the bearing on the other side is provided by the seal 8 which is identical to the seal 7 and which cooperates with annular ribs 29, 30 of the inner and outer rings 1, 2. The ribs 29, 30 and 25, 26 are mutually symmetric with respect to the transverse radial plane passing through the center of the rolling bearing.

Advantageously, the outer radial surfaces 25b, 26b of the ribs 25, 26 and the outer radial surfaces of the ribs 29, 30 are coated to prevent corrosion under the lip tips or ends when the rolling bearing is used in aggressive environments. The coating used can be rubber, zinc, non-corroding steel, ceramic, organic material with ceramics particles, or polytetrafluoroethylene. For instance, the coating can be applied by means of thermal spray, anodizing, physical vapor deposition, cold spray, welding, gluing, etc.

On the embodiment illustrated in FIG. 6, in which identical parts are given identical references, the internal lips 21, 22 comprise, on their external slide, a knuckle or a protrusion 21a, 22a axially extending towards the external lips 23, 24 and radially located near the annular portion 20. The annular protrusions 21a, 22a of the lips 21, 22 are radially disposed near to the root portion of the lips. The axial dimension of the protrusions 21a, 22a is adapted in order their free ends are axially offset relative to the free ends of the lips 21, 22 towards the interior of the rolling bearing. The protrusions 21a, 22a are symmetric with respect to the transverse axial plane passing through the annular portion 20.

With such protrusions, when appears an increase of pressure inside the rolling bearing, for example during lubricating in the bearing factory or during relubrication on the spot of use, for example in windmills, the stress concentration is reduced into the root portions of the internal lips 21, 22. On the embodiment depicted, the external lips 23, 24 comprise, on their internal side, a protrusion 23a, 24a extending towards the internal lips 21, 22 and radially located near the annular portion 20. The protrusions 23a, 24a and 21a, 22a are symmetric with respect to the radial plane passing through the centre of seal 7. With protrusions provided on internal and external lips 21 to 24, in case of axial relative movements between the two rings 1 and 2, the contact between the rings and the seal 7 is maintained.

On this embodiment, a depression 28a is formed on the internal side of the seal 7 radially located between the internal lips 21, 22 in the axial plane passing through the annular portion 20. A depression 28b is also provided on the external side of the seal between the external lips 23, 24. The depressions 28a, 28b are symmetric with respect to the transverse radial plane passing through the centre of the seal.

In the previous embodiments, the seals 7 and 8 are formed from an elastic material like a thermoplastic urethane liner or an elastomer. Alternatively, the seals can be made from metal, for example stainless steel or an extruded metal like a corrosion resistant aluminum alloy. In case of extruded metal, the profile of the seals remains the same. In case of stainless steel, the seals would be of profiled annular bands fixed together.

Figure 7:
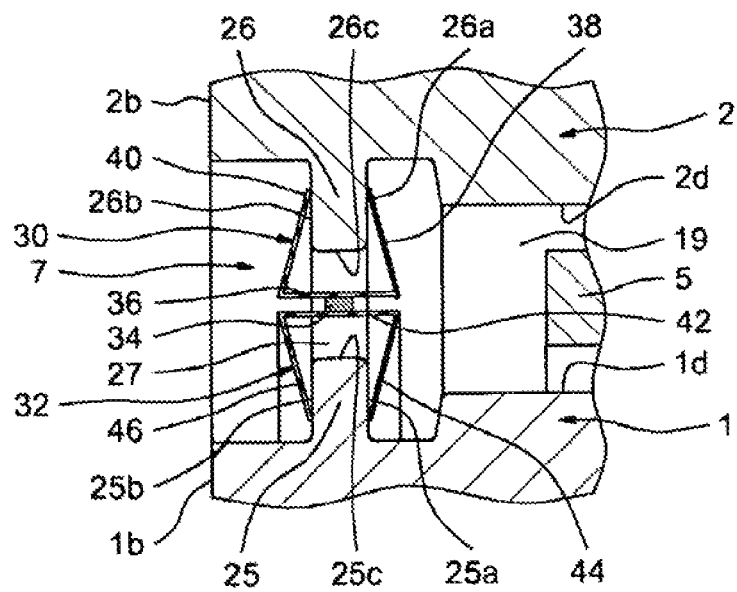
FIGS. 7 and 8 are part sections showing rolling bearings according to third and fourth embodiments of the invention.

For instance, on the embodiment illustrated in FIG. 7, in which identical parts are given identical references, the seal 7 comprises first and second annular parts 30, 32 fixed together by a connection part 34. The first part 30 comprises an annular portion 36, an internal lip 38 and an external lip 40, the lips 38 and 40 being symmetric with respect to a transverse radial plane passing through the centre of the seal. The second part 32 is symmetric to the first part 30 with respect to a transverse axial plane passing through the connection part 34. The second part 32 comprises also an annular portion 42, an internal lip 44 and an external lip 46. The disposition of the internal lips 38, 44 and of the external lips 40, 46 with regards to inner and outer rings 1, 2 is the same as the previously described for the lips 21, 22 and 23, 24. The connection part 34 is radially disposed between the annular portions 36, 42 to connect the two parts 30, 32. The connection part 34 may be electron beam welding, laser welding, soldering, gluing or any other appropriate means.

Figure 8:
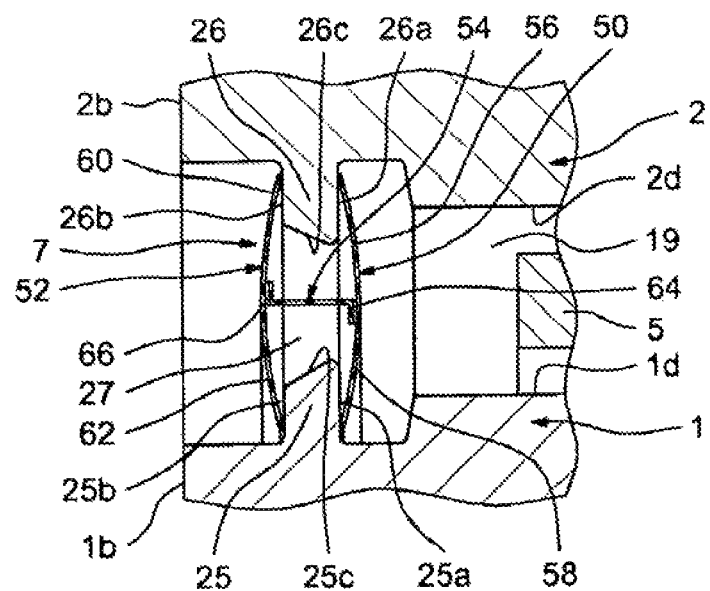

In the embodiment illustrated in FIG. 8, in which identical parts are given identical references, the seal 7 comprises first and second annular parts 50, 52 fixed together by a connection part 54. The first part 50 comprises internal lips 56, 58 made in one part and forming one of the branches of the H-shaped seal. The second part 52 comprises external lips 60, 62 also made in one part and forming the other branch of the H. The two branches are connected by the connection part 54 which has a Z-reversed shape and which can be made of metal. The connection part 54 is linked to the two branches of the seal 7 by connecting means 64, 66, for example electron beam welding, laser welding, soldering, gluing or any other appropriate means.

In the last two embodiments, bended tips extending axially outwards may be provided at the free ends of the internal and external lips to make sure that the zones of contact of the lips with the rings have no deformations. Otherwise, coatings may be provided on the free ends of the internal and external lips to avoid a metal/metal contact between the seal 7 and the rings 1, 2. With seals made from metal, the thickness of the lips may be for example equal to 0.3 mm.

It should be noted that the embodiments illustrated and described were given merely by way of non-limiting indicative examples and that modifications and variations are possible within the scope of the invention. Thus, the invention applies not only to double rows of balls with four-point contact but also to other types of rolling bearing, for example, bearings with a single row of balls, or with at least three rows of balls. It is easily understood that it could also be possible to use bearing with other types of rolling members such as rollers. Otherwise, several seals may be provided on the internal side and/or the external side of the rolling bearing.

In the embodiments depicted, the ribs 25, 29 and 26, 30 are integrally formed with the inner and outer rings 1 and 2. Alternatively, the ribs may also be separate bodies fixed onto the rings by any appropriate means, for example by fitting, pressing, gluing. These bodies may be obtained for example with non-corroding steel, with thermoplastic like polyamide, with polytetrafluorethylene, with elastomer like rubber, or with thermoplastic urethane liner. The disclosed rolling bearings are particularly useful as bearing for wind turbines, which are submitted to high internal pressures and exposed to UV light and rainwater.

What is claimed is:

1. A seal for a rolling bearing, the rolling bearing including:
    an inner ring having an inner ring radial rib extending radially outward;
    an outer ring having an outer ring radial rib extending radially inward and generally opposite the inner ring radial rib; and
    at least one row of rolling elements between the outer and inner rings,
    wherein the seal comprises a metallic body having a generally H-shaped cross-section, and including internal lips and external lips forming the two branches of the H-shaped cross-section, the internal and external lips being connected together, the seal being disposed between the inner and outer rings,
    wherein the inner ring radial rib is located axially between one of the internal lips and one of the external lips and the outer ring radial rib is located axially between the other one of the internal lips and the other one of the external lips such that the radial ribs axially retain the seal.

2. The rolling bearing according to claim 1, wherein the internal and external lips of the seal are resiliently coupled in the axial direction with the radial ribs of the inner and outer rings.

3. The rolling bearing according to claim 1, wherein each of the inner ring radial rib and the outer ring radial rib has an axial thickness, an axial gap is defined between the one internal lip and the one external lip, and an axial gap is defined between the other internal lip and the other external lip, the axial thickness of the radial ribs being greater than the axial gaps between the internal lips and the external lips in a free state of the seal such that contact between the seal and the ribs is maintained by elasticity.

4. The rolling bearing according to claim 1, wherein the seal is moveable in the circumferential direction relative to at least one of the inner ring and the outer ring.

5. The rolling bearing according to any claim 1, wherein each of the inner ring radial rib and the outer ring radial rib has opposing lateral retaining surfaces and the internal lips have an outwardly curved profile so that only the free ends of lips press against the retaining surfaces of the ribs.

6. The rolling bearing according to claim 5, wherein the bearing has a rotational axis and the retaining surfaces of the ribs are substantially perpendicular to the rotational axis of the bearing.

7. The rolling bearing according to claim 1, wherein the inner ring radial rib and the outer ring radial rib define an annular passage, the passage tapering inwardly in an axial direction generally toward the rolling elements.

8. The rolling bearing according to claim 1, wherein the seal has a hardness of at least 90 shore A.

9. The rolling bearing according to claim 1, wherein at least the internal lips each have an external side and a protrusion axially extending from the external side and towards the external lips.

10. The rolling bearing according to claim 1, wherein the rib of each one of the inner and outer rings is one of integrally formed with a remainder of the ring and a separate body connected with a remainder of the ring.

11. The rolling bearing according to claim 1, wherein each of the inner ring radial rib and the outer ring radial rib has an outer surface and a coating on the outer surface.

* * * * *